(12) United States Patent
Oohara

(10) Patent No.: US 8,199,424 B2
(45) Date of Patent: Jun. 12, 2012

(54) LIBRARY APPARATUS, LIBRARY SYSTEM AND MEDIUM TRANSPORTATION METHOD OF LIBRARY APPARATUS

(75) Inventor: Tsuneyoshi Oohara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/955,530

(22) Filed: Nov. 29, 2010

(65) Prior Publication Data

US 2011/0069412 A1    Mar. 24, 2011

Related U.S. Application Data

(63) Continuation of application No. PCT/JP2008/001617, filed on Jun. 23, 2008.

(51) Int. Cl.
*G11B 15/68* (2006.01)

(52) U.S. Cl. ........................................ 360/92.1

(58) Field of Classification Search .............. 360/92.1, 360/98.04, 98.06; 369/30.39, 30.43, 30.45, 369/30.63
See application file for complete search history.

(56) References Cited

U.S. PATENT DOCUMENTS

| | | | |
|---|---|---|---|
| 5,045,958 A * | 9/1991 | Leonard et al. | 360/92.1 |
| 5,289,589 A | 2/1994 | Bingham et al. | |
| 5,870,245 A | 2/1999 | Kersey et al. | |
| 5,940,356 A * | 8/1999 | Toumbas | 369/30.39 |
| 6,924,954 B2 | 8/2005 | Suzuki | |
| 6,956,715 B2 * | 10/2005 | Mueller et al. | 360/92.1 |
| 2006/0099382 A1 | 5/2006 | Hori et al. | |

FOREIGN PATENT DOCUMENTS

| | | |
|---|---|---|
| JP | 03-130957 | 6/1991 |
| JP | 6-342408 | 12/1994 |
| JP | 7-14289 | 1/1995 |
| JP | 8-6738 | 1/1996 |
| JP | 2003-67999 | 3/2003 |
| JP | 2003-162857 | 6/2003 |
| JP | 2006-160516 | 6/2006 |

OTHER PUBLICATIONS

International Search Report for PCT/JP2008/001617, mailed on Jul. 15, 2008.
Korean Office Action for corresponding Korean Application 10-2010-7028497; mailed Dec. 30, 2011.

* cited by examiner

*Primary Examiner* — Angel A. Castro
(74) *Attorney, Agent, or Firm* — Staas & Halsey LLP

(57) ABSTRACT

A library apparatus includes a housing having an opening, a cell unit including a plurality of cells for storing a storage medium, a drive unit for writing data into or reading data from the storage medium, a medium transportation unit for accessing each of the cells and the drive unit and for transporting the storage medium between the cells and between each of the cells and the drive unit, a cell unit driver for moving the cell unit in vertical direction, and a controller for driving the cell unit driver to move the cell unit through the opening to a position accessible by a medium transportation unit of another library apparatus stacked in vertical direction.

8 Claims, 15 Drawing Sheets

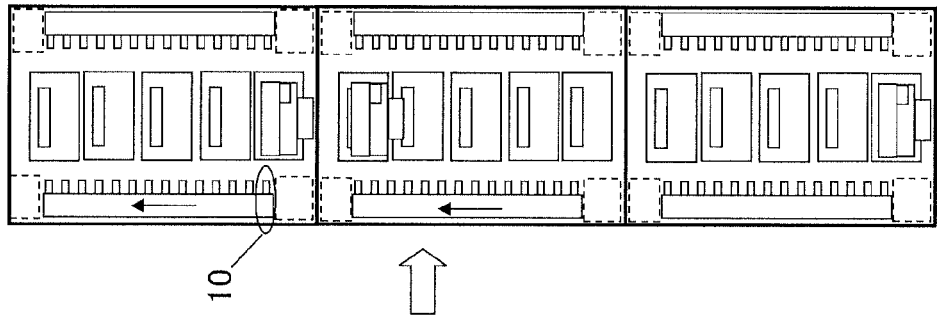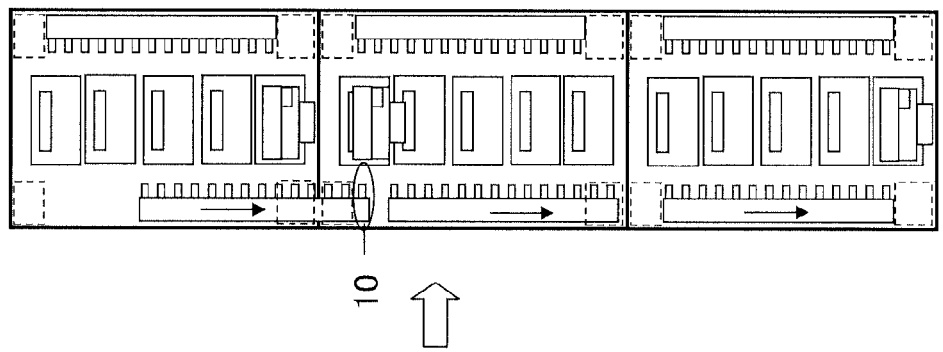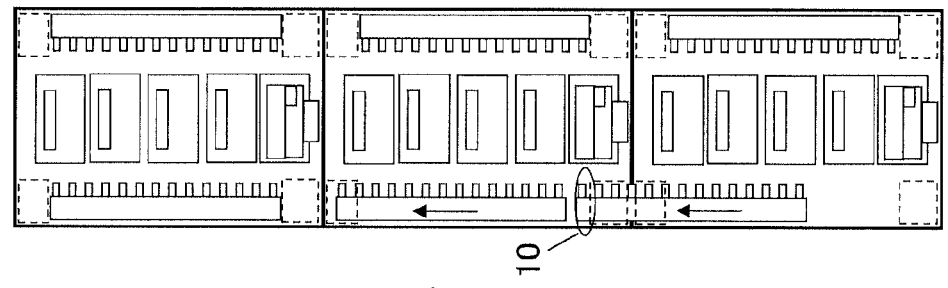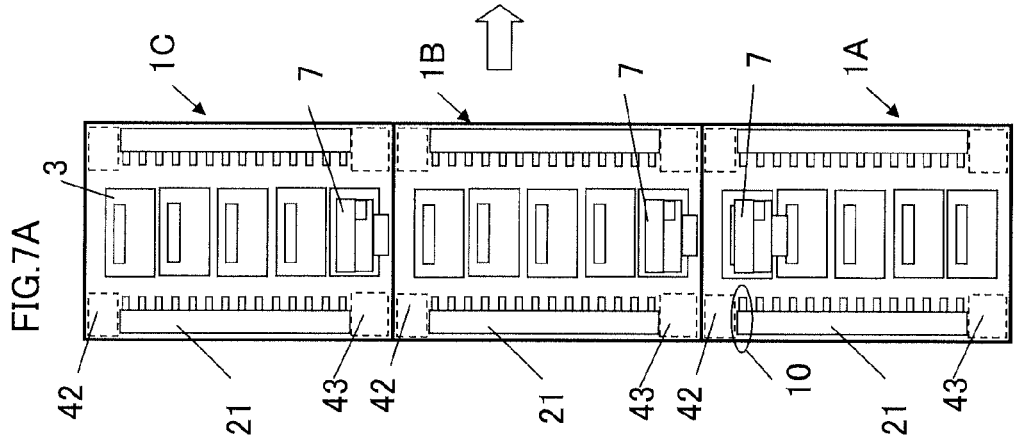

US 8,199,424 B2

LIBRARY APPARATUS, LIBRARY SYSTEM AND MEDIUM TRANSPORTATION METHOD OF LIBRARY APPARATUS

CROSS-REFERENCE TO RELATED APPLICATIONS

This is a continuation of Application PCT/JP2008/001617, filed on Jun. 23, 2008, the entire contents of which are incorporated herein by reference.

FIELD

The embodiments discussed herein are related to a technology for a library apparatus, a library system and a medium transportation method of the library apparatus.

BACKGROUND

In a library system that a plurality of library apparatuses are only stacked, a storage medium is incapable of being transported between the library apparatuses. Therefore, while a drive unit of a first library apparatus of the library apparatuses is used, even if a second library apparatus of the library apparatuses has a drive unit which is not used, the drive unit which is not used is incapable of being used by the first library apparatus. Therefore, operation rate of the library system is low. Then, the library apparatus equipped with a medium transportation mechanism is developed. It enables the transportation of the storage medium between the library apparatuses. For instance, the medium transportation mechanism that provides a new elevator mechanism for transporting the storage medium between the stacked library apparatuses is well-known. A portion of space for cells and drive units arranged along movement area of a robot is used for the new elevator mechanism. U.S. Pat. No. 5,870,245 is an example of conventional technique.

A portion of space for the drive units and the cells in each of the library apparatuses is occupied for an area where an elevator moves. Therefore the number of the storage mediums which are mounted in the library apparatus equipped with the medium transportation mechanism decreases comparing with that of the library apparatus that is not equipped with the medium transportation mechanism.

SUMMARY

According to an aspect of the invention, a library apparatus includes a housing having an opening, a cell unit including a plurality of cells for storing a storage medium, a drive unit for writing data into or reading data from the storage medium, a medium transportation unit for accessing each of the cells and the drive unit and for transporting the storage medium between the cells and between each of the cells and the drive unit, a cell unit driver for moving the cell unit in vertical direction, and a controller for driving the cell unit driver to move the cell unit through the opening to a position accessible by a medium transportation unit of another library apparatus stacked in vertical direction.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 7A to 7D illustrate an operation explanatory diagram of the cell unit.

DESCRIPTION OF EMBODIMENT

Hereinafter, a library apparatus and a library system according to an embodiment is described in detail with reference to the accompanying drawings.

Figure 1:
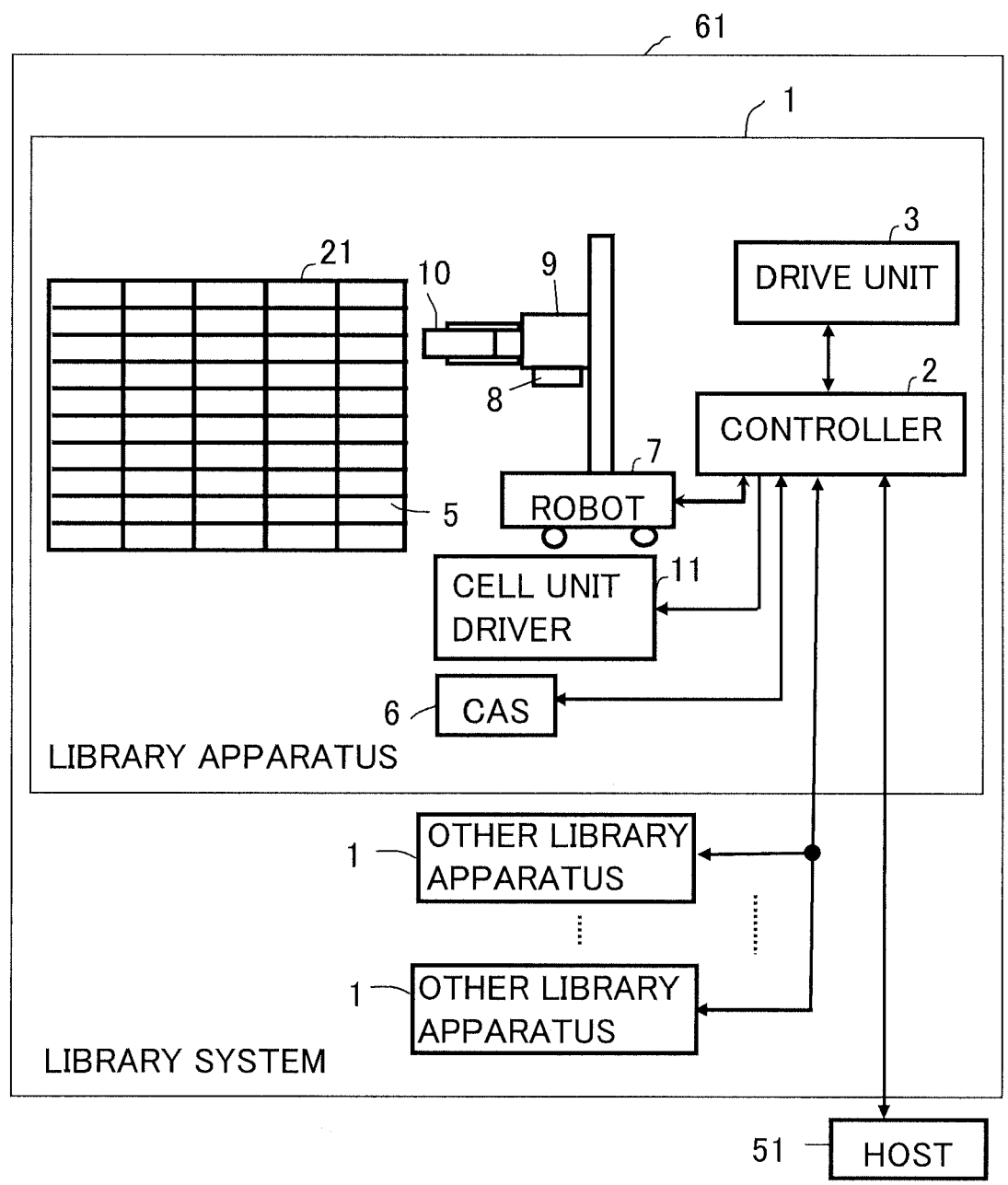
FIG. 1 illustrates a block diagram of a library system.

FIG. 1 illustrates a block diagram of a library system 61. The library system 61 includes a plurality of library apparatuses 1 which are stacked in a vertical direction. One of the library apparatuses 1 is connected with a host 51. The remaining other library apparatuses 1 are not connected with the host 51. On the other hand, the library apparatuses 1 are connected with each other.

The library apparatus 1 includes a controller 2, a drive unit 3, a cell unit 21, a cartridge access station 6 (hereinafter referred to as CASE), a robot 7, a storage medium 10, and a cell unit driver 11.

The controller 2 performs a control of the library apparatus 1. For instance, when the controller 2 receives from the host 51 an instruction for writing data into the storage medium 10 or reading data from the storage medium 10, the controller 2 controls the robot 7 to move to a cell 5 where the storage medium 10 having an identification number instructed by the host 51 is stored. Next, the controller 2 controls the robot 7 to remove the storage medium 10 from the cell 5, to transport the storage medium 10 to the drive unit 3 and to set the storage medium 10 in the drive unit 3. And, after the data is written into or read from the storage medium 10, the storage medium 10 is removed from the drive unit 3, transported to the original cell 5 and stored in the original cell 5. When the controller 2 moves the storage medium 10 to one of other library apparatuses 1, the controller 2 drives the cell unit driver 11 and moves the cell unit 21. At this time, the controller 2 transmits a control data through an interface to the one of other library apparatuses 1. The control data is, for instance, a drive unit number instructed from the host 51, the identification number of the storage medium 10 for being transported, an instruction for moving the cell unit 21 and the instruction for writing date into or reading data from the storage medium 10.

The drive unit 3 is a magnetic tape drive unit that writes data into or reads from the storage medium 10. The cell unit 21 includes a plurality of the cells 5 that are arranged in matrix shape. The CAS 6 is a mechanism to load the storage medium 10 into the library apparatus 1 or to eject the storage medium 10 from the library apparatus 1.

The robot 7 is a medium transportation unit to access and to transport the storage medium 10 between the drive unit 3 and the cell 5, between the cell 5 and the cell 5, or between the cell 5 and the CAS 6. Moreover, the robot 7 has a CCD sensor 8 for detecting the identification number of the storage medium 10 and a hand 9 for holding the storage medium 10. The CCD sensor 8 is equipped with the hand 9 and scans the bar-code label put on the storage medium 10 to read the bar code. And, the read data is transmitted to the controller 2. A bar-code data is, for instance, the identification number of the storage medium 10. The hand 9 stores the storage medium 10 into the cell 5, and removes the storage medium 10 from the cell 5.

For instance, the storage medium 10 is a cartridge tape that the magnetic tape rolled in the reel is set in a case. A bar-code label that the identification number is printed is put on the back side of the storage medium 10. The cell unit driver 11 drives the cell unit 21 in the vertical direction.

Figure 2:
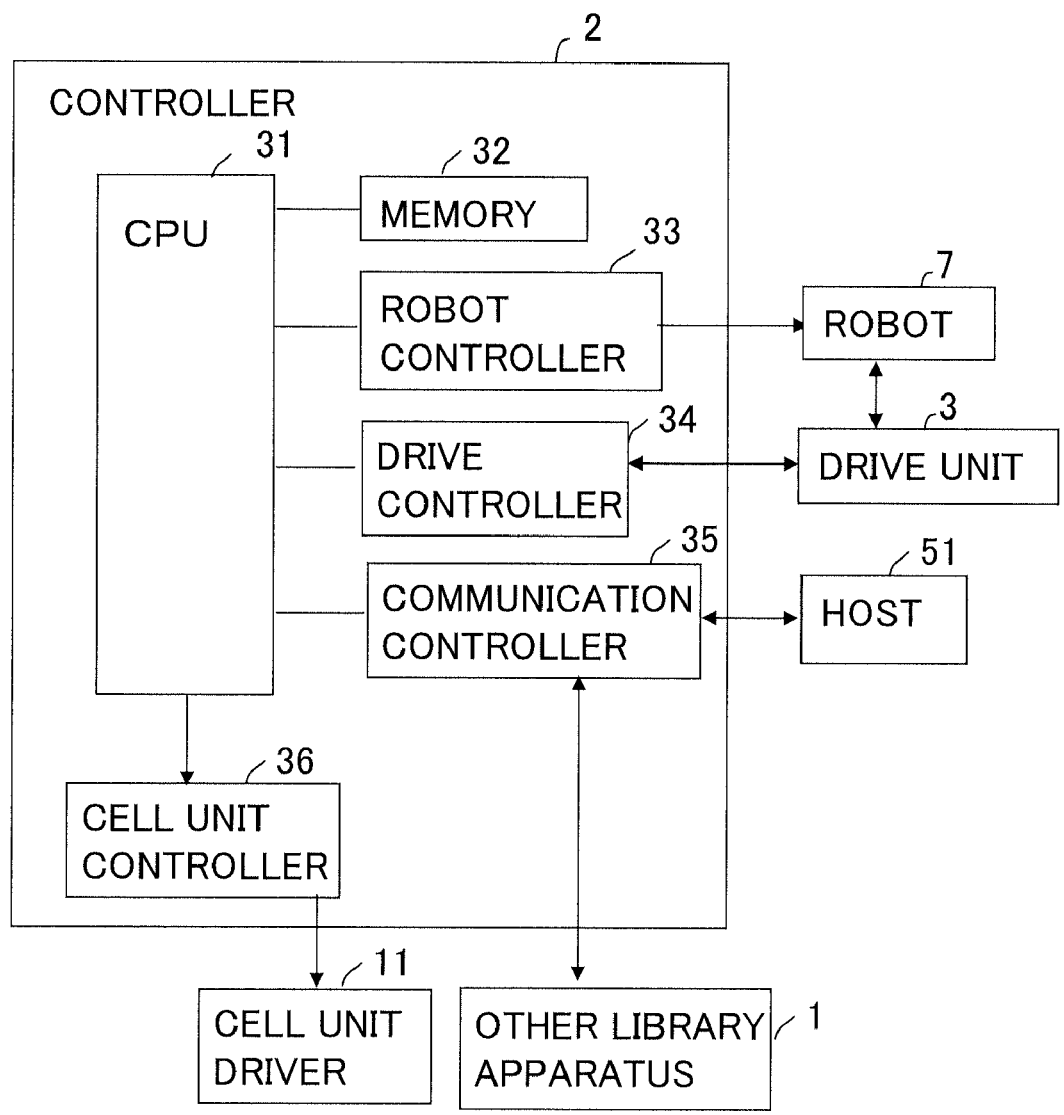
FIG. 2 illustrates a block diagram of a controller.

FIG. 2 illustrates a block diagram of the controller 2. The controller 2 includes a CPU 31, a memory 32, a robot controller 33, a drive controller 34, a communication controller 35 and a cell unit controller 36. The CPU 31 is a processor. And, the CPU 31 performs a control of the library apparatus 1 by controlling the memory 32, the robot controller 33, the drive controller 34, the communication controller 35, and the cell unit controller 36. For instance, the CPU 31 performs processing that transports the storage medium 10 from one library apparatus 1 to another library apparatus 1. Moreover, the CPU 31 performs each processing according to a control program stored in the memory 32. The memory 32 stores various programs and various data of the library apparatus 1. The robot controller 33 drives the robot 7, and moves the robot 7 to the cell 5 where the storage medium 10 having the identification number instructed from the host 51 is stored. Next, the robot 7 removes the storage medium 10, transports the storage medium 10 to the drive unit 3, and set the storage medium 10 in the drive unit 3. And, after writing data into the storage medium 10 or reading data from the storage medium 10 is completed, the robot 7 removes the storage medium 10 from the drive unit 3 and transports the storage medium 10 to the original cell 5 to store the storage medium 10 in the original cell 5. The drive controller 34 controls to write data into the storage medium 10 or to read data from the storage medium 10. The communication controller 35 controls to communicate with the host 51 and other library apparatuses 1. The cell unit controller 36 controls the cell unit driver 11 to drive the cell unit 21. For instance, the cell unit controller 36 moves the cell unit 21 to the position where the robot 7 of a nearby other library apparatus 1 that are stacked in the vertical direction is capable of accessing.

Figure 3A:
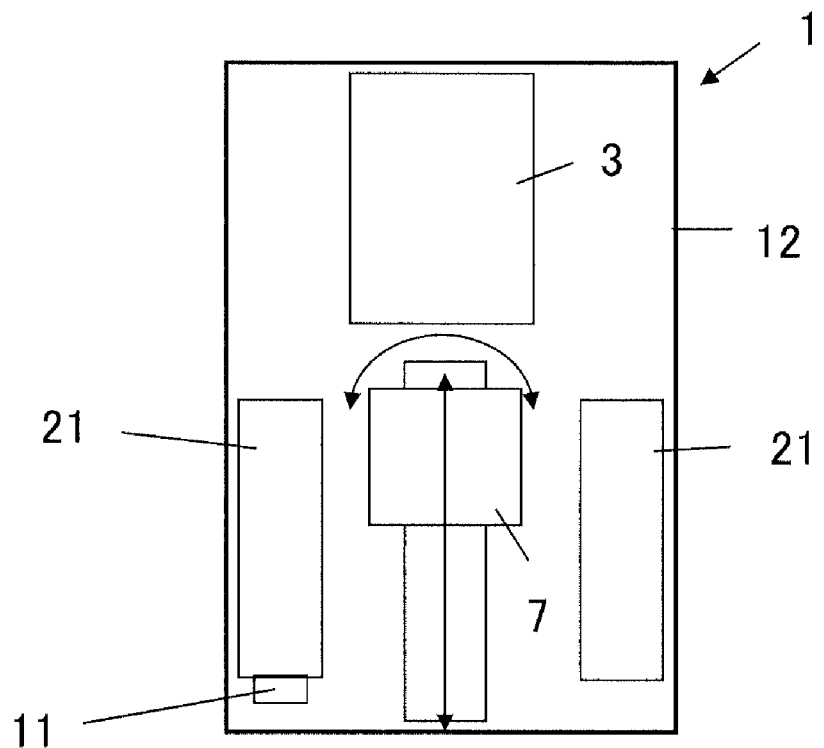
FIGS. 3A and 3B schematically illustrate a top view of a library apparatus.
Figure 3B:
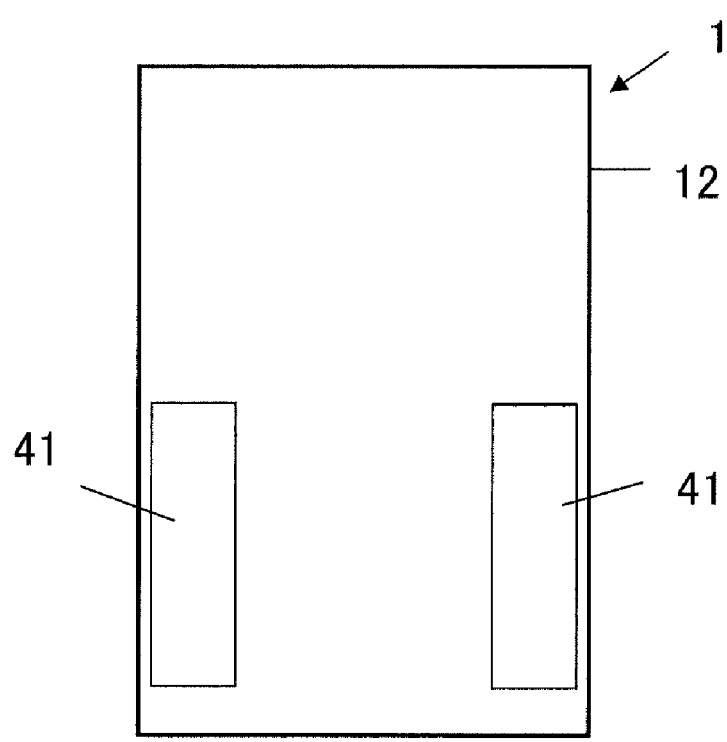

FIGS. 3A and 3B schematically illustrate a top view of the library apparatus 1. FIG. 3A schematically illustrates a transparent top view of the library apparatus 1. In FIG. 3A, the cell unit 21 that stores the storage mediums 10 is arranged at both right and left sides in the library apparatus 1. And the drive unit 3 is arranged at back side in the library apparatus 1 in FIG. 3A. The drive units 3 are stacked in the vertical direction. The robot 7 is arranged at the center of the library apparatus 1. As the robot 7 moves in a front-back direction and in an up-down direction, rotates in a right-left direction, the robot 7 has a structure accessible to the cell 5 of the cell unit 21 and the drive unit 3. The cell unit driver 11 is arranged, for instance, only on a left cell unit 21 in FIG. 3A. Moreover, the cell unit driver 11 may be arranged only on a right cell unit 21 or on both the right cell unit 21 and the left cell unit 21. Moreover, a housing 12 of the library apparatus 1 is in a rectangular parallelepiped shape.

FIG. 3B schematically illustrates a top view of the housing 12 of the library apparatus 1. Two openings 41 are formed in the top plate of the housing 12 of the library apparatus 1 as illustrated in FIG. 3B. The cell unit 21 moves into other library apparatus 1 through the openings 41. When the cell unit 21 is moved downward, the openings 41 are also formed in the bottom plate of the housing 12 of the library apparatus 1. In the case where the openings 41 are not used, plates for covering the openings 41 are provided.

Figure 4:
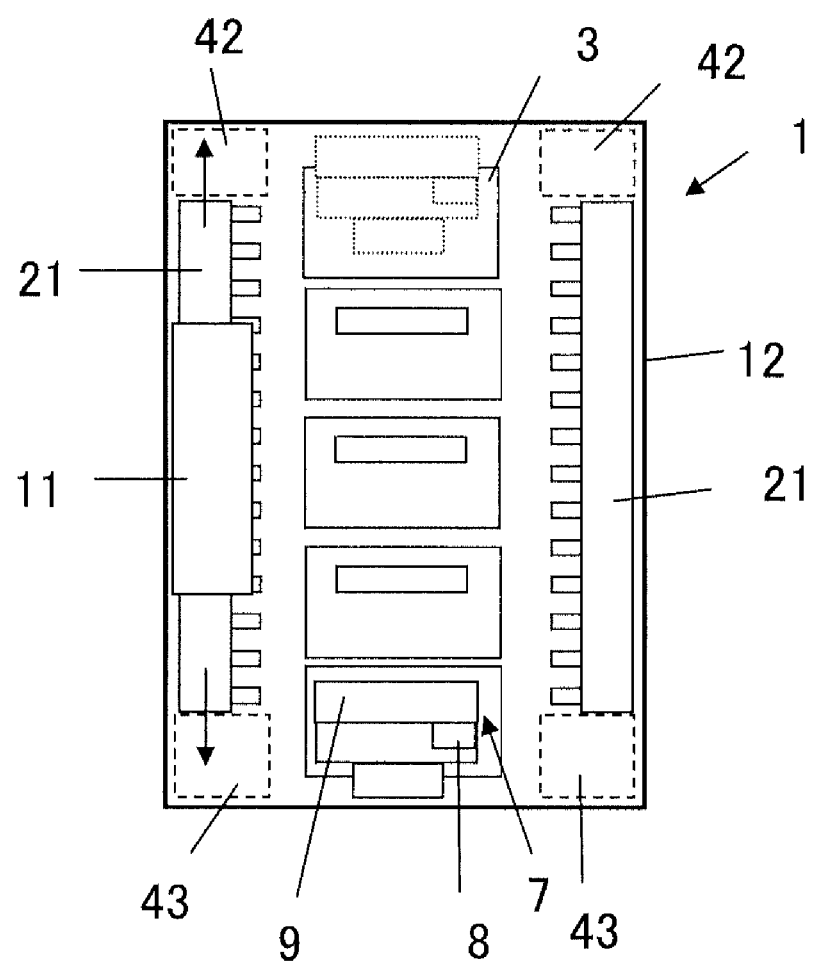
FIG. 4 schematically illustrates a transparent front view of the library apparatus.

FIG. 4 schematically illustrates a transparent front view of the library apparatus 1. For instance, the CCD sensor 8 is mounted underneath the hand 9 of the robot 7. The CCD sensor 8 may be also on or within the hand 9.

An accessible position of the robot 7 is a position that the hand 9 can access the storage medium 10 and the CCD sensor 8 can read the bar-code label of the storage medium 10. Therefore, when the CCD sensor 8 is mounted on or underneath the hand 9, a space 42 and a space 43 that the robot 7 is incapable of accessing the storage medium 10 are formed. The space 42 and the space 43 are formed at an upper portion and a lower portion of the library apparatus 1, respectively. Moreover, even if the CCD sensor 8 is mounted within the hand 9, as a space is needed for arranging the robot 7 in the library apparatus 1, the space 42 and the space 43 are formed at a position that the robot 7 is incapable of accessing the storage medium 10. Moreover, the space 42 and the space 43 are used as retraction areas of the cell unit 21. Moreover, since a cell unit 21 of a nearby other library apparatus 1 moves to the accessible position of the robot 7 in the self-library apparatus 1, it is needed that the self-library apparatus 1 has the retraction areas which are formed so as to have height enough to retract a portion of the cell unit 21 of the self-library apparatus 1. And, when the cell unit 21 of the nearby other library apparatus 1 moves to the accessible position of the robot 7 of the self-library apparatus 1 through the opening 41, the cell unit controller 36 of the self-library apparatus 1 controls to drive the cell unit driver 11 and to move the portion of the cell unit 21 of the self-library apparatus 1 into the space 42 or the space 43 of the self-library apparatus 1.

The space 42 is an area between the upper surface of housing 12 and the upper surface of cell unit 21. The space 43 is an area between the bottom of housing 12 and the bottom of cell unit 21. Each of the space 42 and the space 43 is used as the retraction area of the portion of the cell unit 21. As a result, when the library apparatuses are stacked, it can be avoided that the cell unit 1 protrudes out of the opening 41 of the uppermost library apparatus 1 or the lowermost library apparatus 1.

The cell unit 21 can be moved in the vertical direction of the library apparatus 1 by the cell unit driver 11. For instance, the cell unit driver 11 is mounted only on the left cell unit 21. And the cell unit driver 11, which allows the cell unit 21 to move in the vertical direction, can be realized by various methods.

Figure 5:
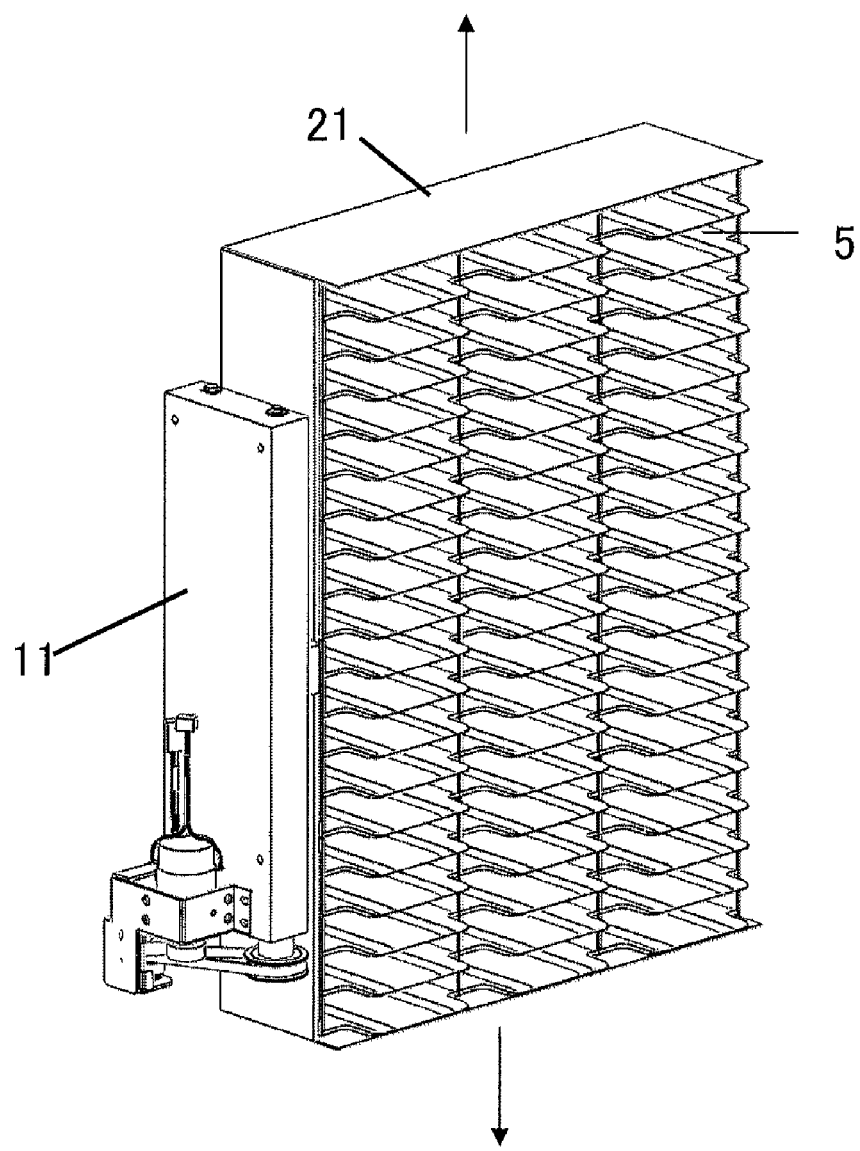
FIG. 5 illustrates an explanatory diagram of a cell unit.

FIG. 5 illustrates an explanatory diagram of the cell unit 21. The cell unit driver 11 is mounted on the cell unit 21 as illustrated in FIG. 5. The arrow indicates that the cell unit 21 moves in the vertical direction.

Figure 6:
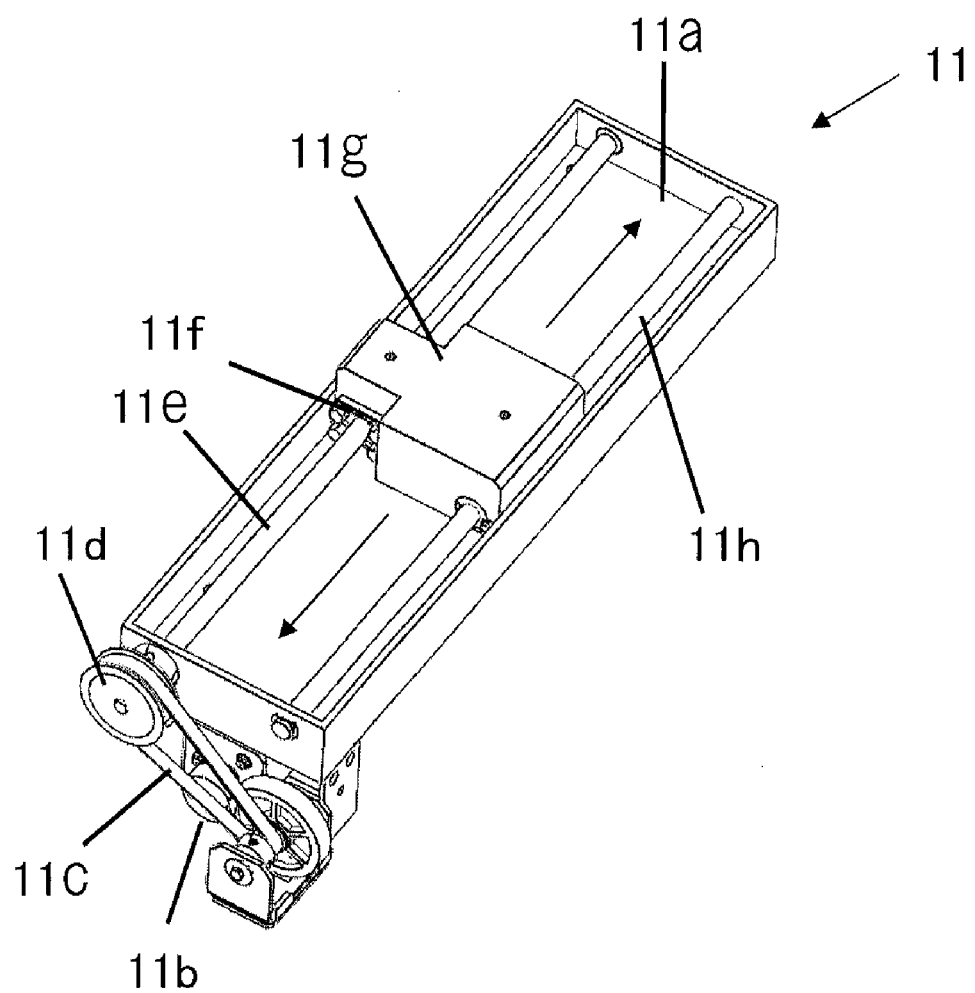
FIG. 6 illustrates an explanatory diagram of a cell unit driver.

FIG. 6 illustrates an explanatory diagram of the cell unit driver 11. The cell unit driver 11 is mounted on the housing 12 of the library apparatus 1 by fixing a base 11a with a screw. A motor 11b is mounted on the base 11a. The driving force of the motor 11b is transmitted to a pulley 11d through a belt 11c. A ball screw shaft 11e is coaxially fixed to the pulley 11d so as to rotate with the pulley 11d. The ball screw shaft 11e and the pulley 11d are rotatably mounted on the base 11a through a bearing.

Moreover, a shaft 11h is mounted on the base 11a. A block 11g is coupled with the shaft 11h through a direct-acting bearing or a bush. And, the block 11g is coupled so as to be movable in the axial direction of the shaft 11h. Moreover, the block 11g is fixed to a nut 11f of the ball screw with the screw. The block 11g moves in the direction of an arrow with the nut 11f of the ball screw, when the ball screw shaft lie rotates by driving the motor 11b.

The cell unit 21 is fixed to the block 11g with the screw, and moves in the vertical direction of the library apparatus 1 with the block 11g by driving the motor 11b. Moreover, if guides such as a recess and a protrusion which are fitted with each other between the housings 12 and the cell unit 21 are provided, the inclination of the cell unit 21 can be suppressed. Though the number of columns of the cells in the cell unit 21 is 3 columns as illustrated in FIG. 5, the same mechanism can be used even if the cell unit 21 has one column of the cells or two columns of the cells. And the number of the columns of the cells in the cell unit 21 is arbitrary.

FIGS. 7A to 7D illustrate an operation explanatory diagram of the cell unit. For instance, as illustrated in FIG. 7, the three library apparatuses are stacked vertically in three stages, namely a lower stage, a middle stage and an upper stage. When the library apparatuses 1 are stacked, the library apparatuses 1 are stacked so that the openings 41 of two adjacent library apparatuses 1 are adjacent to each other and the positions of the openings 41 coincide with each other. And, the two adjacent library apparatuses 1 are positioned by a pin and coupled with a screw. At this time, the plate for covering the opening 41 is removed so as to allow the cell unit 21 of the library apparatus 1 to move between the library apparatuses 1.

For instance, the library apparatus 1 placed in the lower stage (hereinafter called "lower library apparatus 1A") is connected with the host 51. The library apparatus 1 placed in the middle stage (hereinafter called "middle library apparatus 1B") and the library apparatus 1 placed in the upper stage (hereinafter called "upper library apparatus 1C") are connected with each other, and also connected with the lower library apparatus 1A.

The host 51 may issue an instruction to the lower library apparatus 1A. For instance, the instruction is a instruction for reading data from the storage medium 10 stored in the cell 5 of the lower library apparatus 1A using the drive unit 3 of the upper library apparatus 1C. The storage medium and the drive unit are specified by the host 51.

In this case, first of all, the lower library apparatus 1A transmits information of the specified the drive unit 3 and instruction information for reading data from the specified storage medium 10 to the upper library apparatus 1C. The host 51 manages the drive unit 3 and the storage medium 10.

Therefore, the specified storage medium 10 is transported from the lower library apparatus 1A to the specified drive unit 3 of the upper library apparatus 1C via the middle library apparatus 1B. First of all, the robot 7 of the lower library apparatus 1A removes the specified storage medium 10 from the cell 5, and stores the specified storage medium 10 into the uppermost cell 5 of the cell unit 21 of the lower library apparatus 1A as illustrated in FIG. 7A. Next, the cell unit 21 of the middle library apparatus 1B moves up and a portion of the cell unit 21 of the middle library apparatus 1B enters into the space 42. Then, the cell unit 21 of the lower library apparatus 1A moves up and a portion of the cell unit 21 of the lower library apparatus 1A enters into the space 43 in the middle library apparatus 1B, and the uppermost cell 5 of the cell unit 21 of the lower library apparatus 1A is located at a position accessible by the robot 7 of the middle library apparatus 1B.

Next, the robot 7 of the middle library apparatus 1B removes the specified storage medium 10 from the uppermost cell 5 of the cell unit 21 of the lower library apparatus 1A as illustrated in FIG. 7B. Next, the cell unit 21 of the lower library apparatus 1A moves down to return to a normal position. The normal position is a position that the robot 7 can access to all of the cells 5. Then, the cell unit 21 of the middle library apparatus 1B moves down and a portion of the cell unit 21 of the middle library apparatus 1B enters into the space 43 in the middle library apparatus 1B. Then, the cell unit 21 of the upper library apparatus 1C moves down and a portion of the cell unit 21 of the upper library apparatus 1C enters into the space 42 in the middle library apparatus 1B. And the lowermost cell 5 of the cell unit 21 of the upper library apparatus 1C is located at a position accessible by the robot 7 of the middle library apparatus 1B. Then, the robot 7 of the middle library apparatus 1B transports up the specified storage medium 10 which is removed from the lower library apparatus 1A. And the specified storage medium 10 is located at a position for accessing the lowermost cell 5 of the cell unit 21 of the upper library apparatus 1C.

And, as illustrated in FIG. 7C, the robot 7 of the middle library apparatus 1B stores the specified storage medium 10 that is removed from the lower library apparatus 1A into the lowermost cell 5 of the cell unit 21 of the upper library apparatus 1C. Next, as illustrated in FIG. 7D, the cell unit 21 of the upper library apparatus 1C moves up and the lowermost cell 5 is located at a position accessible by the robot 7 of the upper library apparatus 1C. At this time, the middle library apparatus 1B moves up to return to a normal position. The normal position is a position that the robot 7 can access to all of the cells 5. The robot of the upper library apparatus 1C removes the specified storage medium 10 at the lowermost position of the cell unit 21 of the upper library apparatus 1C and transports the removed storage medium 10 to the specified drive unit 3 of the upper library apparatus 1C. And, the upper library apparatus 1C reads data from the storage medium 10, and transmits the read data to the lower library apparatus 1A via the communication controller 35 of the upper library apparatus 1C. The lower library apparatus 1A transmits the received data to the host 51.

As described above, while space for cells 5 and space for drive units 3 are held equal to that of a conventional library apparatus which does not include a medium transportation mechanism by using the space 42 and the space 43, the medium transportation mechanism that transports the storage medium 10 between the library apparatuses 1 may be realized. In this description, the uppermost cell 5 and the lowermost cell 5 are used to transport the storage medium 10 between the stacked library apparatuses 1. A plurality of the cells 5 that includes the cells 5 such as the second-to-the uppermost cell 5 and the second-to-the lowermost cell 5 may be used depending on the size of the space 42 and the size of the space 43. In this description, the cell unit 21 is provided at one side in the housing 12. However the cell units 21 may be provided at both sides in the housing 12, and may move up and down concurrently. Moreover, the cell units 21 of the library apparatuses 1 may move up and down concurrently by synchronizing with each other. Moreover, the storage medium 10 may be stored in the uppermost cell 5 of the middle library apparatus 1B, and the cell unit 21 of the middle library apparatus 1B may move up to the upper library apparatus 1C.

Next, a transportation processing is described in detail, which is a processing that the lower library apparatus 1A, the middle library apparatus 1B and the upper library apparatus 1C transport the storage medium 10. For instance, the storage medium 10 specified by the host 51 is transported from the lower library apparatus 1A to the drive unit 3 of the upper library apparatus 1C specified by the host 51. The uppermost cell 5 and the lowermost cell 5 are preliminarily determined as the cells 5 that are temporarily stored to transport the storage medium 10. However depending on the size of the space, the cells 5 other than both of uppermost cell 5 and the lowermost cell 5 may be used as the cells 5 for transporting the storage medium 10. Moreover, information of the specified the drive unit 3 and instruction information for reading data from or writing data into the specified storage medium 10 are transmitted from the lower library apparatus 1A.

Figure 8A:
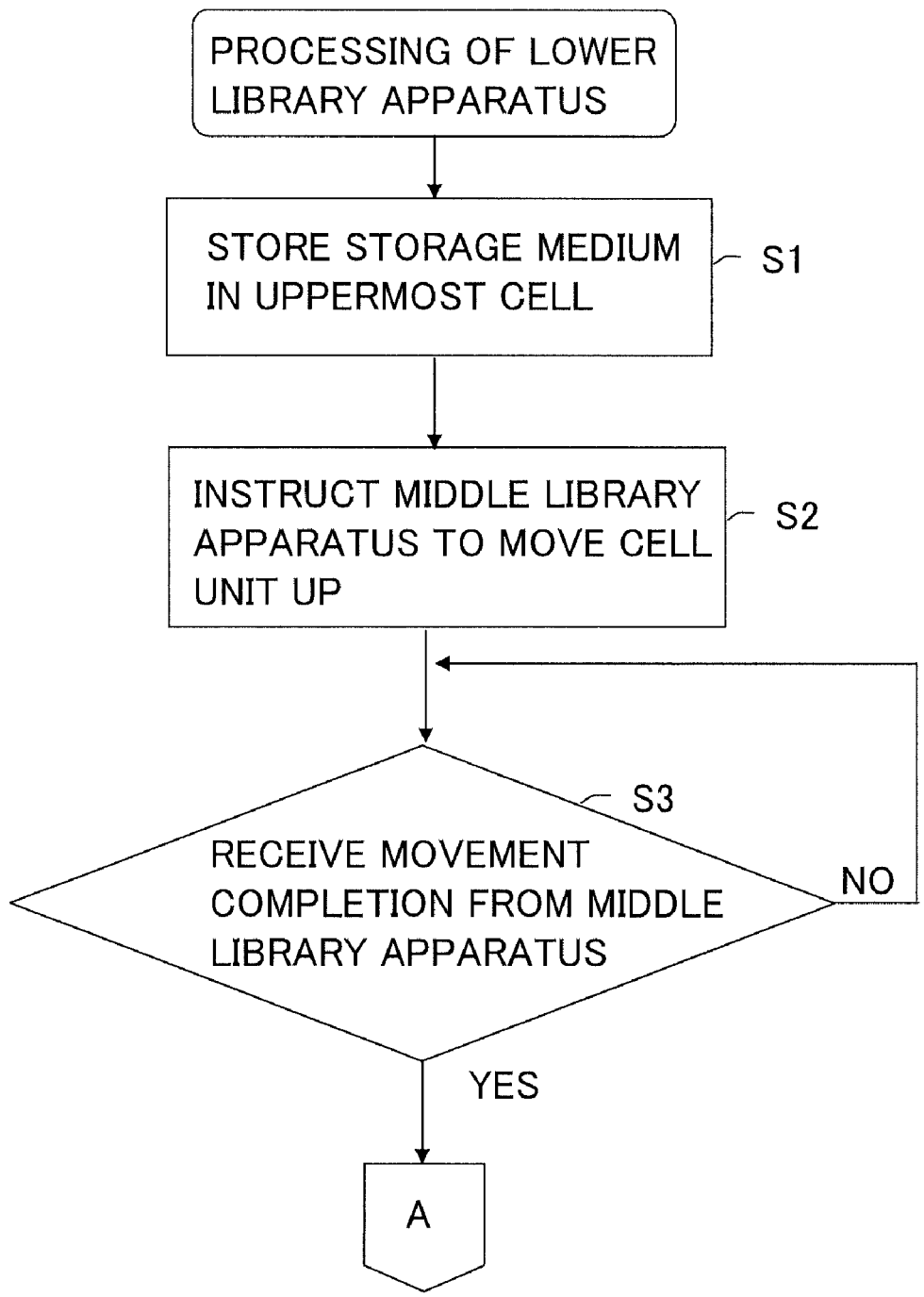
FIGS. 8A and 8B illustrate a flow chart of a lower library apparatus.
Figure 8B:
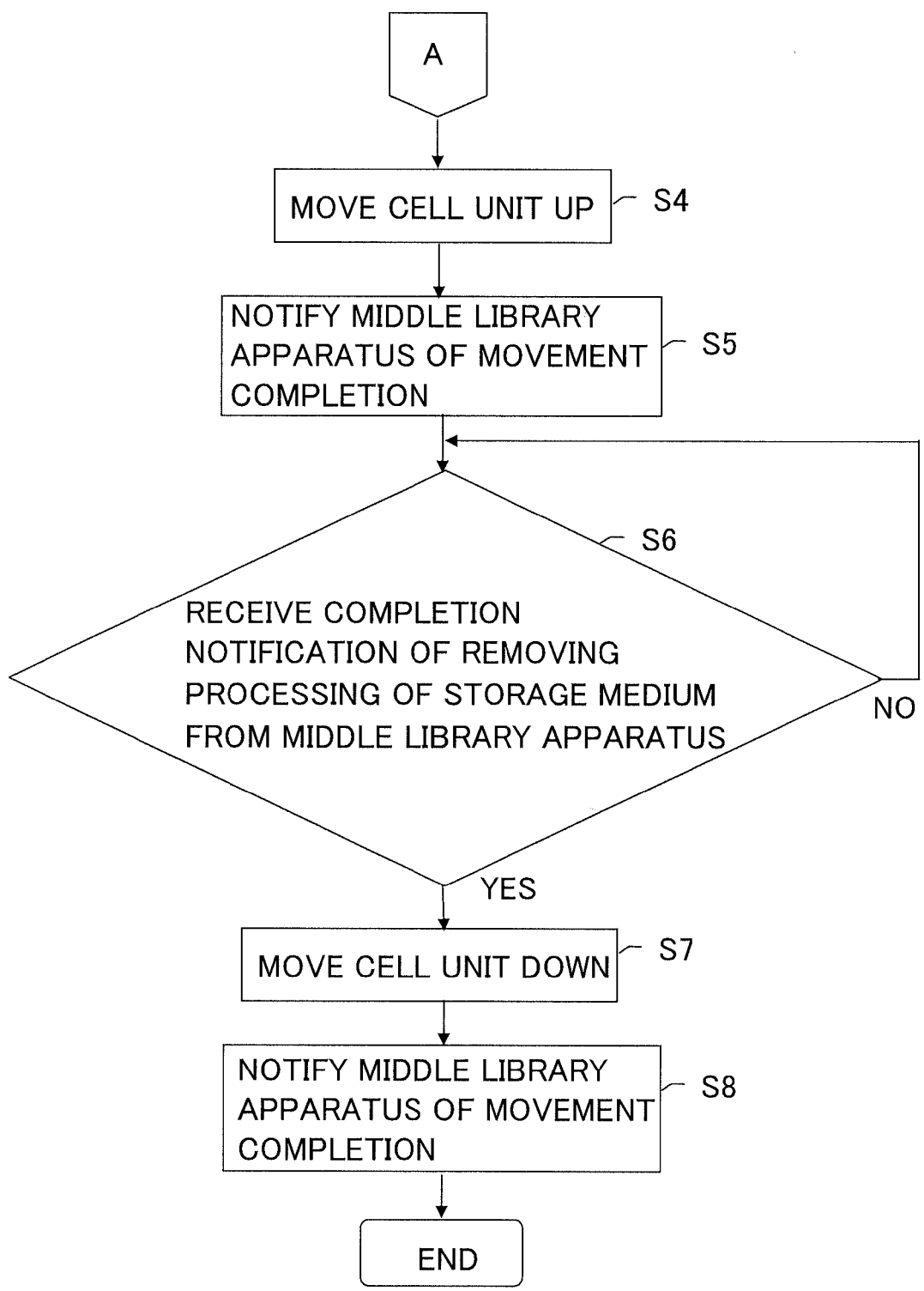

FIGS. 8A and 8B illustrate a flow chart of a lower library apparatus 1A. FIG. 8A illustrates step S1 to step S3. A processing of the lower library apparatus 1A is controlled by the CPU 31 of the lower library apparatus 1A. In step S1, the lower library apparatus 1A stores the storage medium 10 specified by the host 51 into the uppermost cell 5. In step S2, the lower library apparatus 1A instructs the middle library apparatus 1B to move up the cell unit 21 of the middle library apparatus 1B. The identification number of the specified storage medium 10 is given to the middle library apparatus 1B. In step S3, the lower library apparatus 1A checks whether to receive notification of the movement completion from the middle library apparatus 1B. FIG. 8B illustrates step S4 to step S8. In step S4, when the notification of the movement completion is received from the middle library apparatus 1B, the lower library apparatus 1A moves up the uppermost cell 5 of the cell unit 21 of the lower library apparatus 1A to the position where the specified storage medium 10 in the uppermost cell 5 is accessible by the robot 7 of the middle library apparatus 1B. In step S5, when the movement of the cell unit 21 of the lower library apparatus 1A is completed, the lower library apparatus 1A notifies the middle library apparatus 1B of completion of the movement processing. In step S6, the lower library apparatus 1A checks whether to receive completion notification of the removing processing of the specified storage medium 10 from the middle library apparatus 1B. In step S7, when the lower library apparatus 1A receives the completion notification of the removing processing of the specified storage medium 10 from middle library apparatus 1B, the cell unit 21 of the lower library apparatus 1A is moved down to return to the normal position. In step S8, the lower library apparatus 1A notifies the middle library apparatus 1B of completion of the movement processing.

Figure 9A:
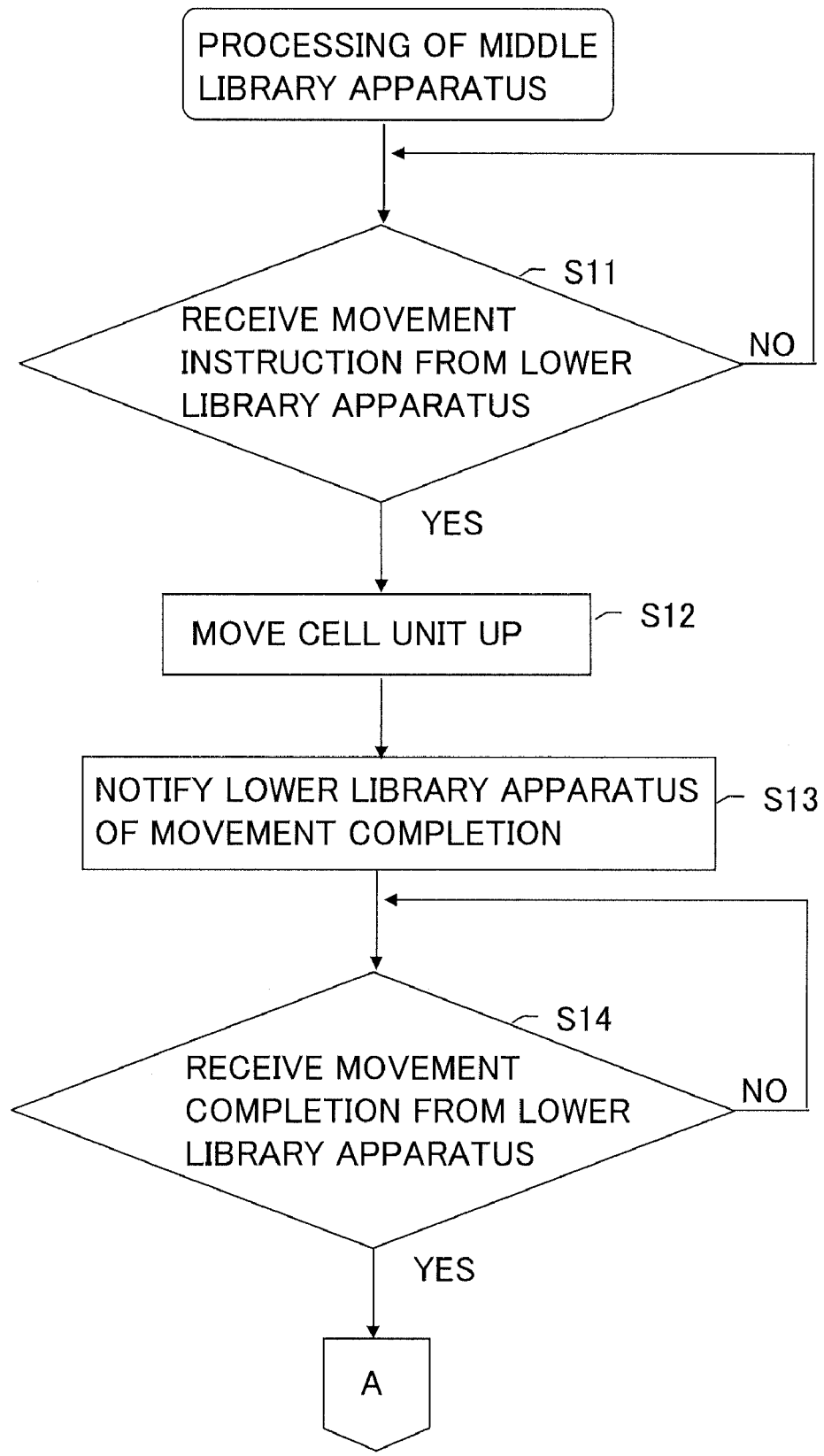
FIGS. 9A to 9D illustrate a flow chart of a middle library apparatus.
Figure 9B:
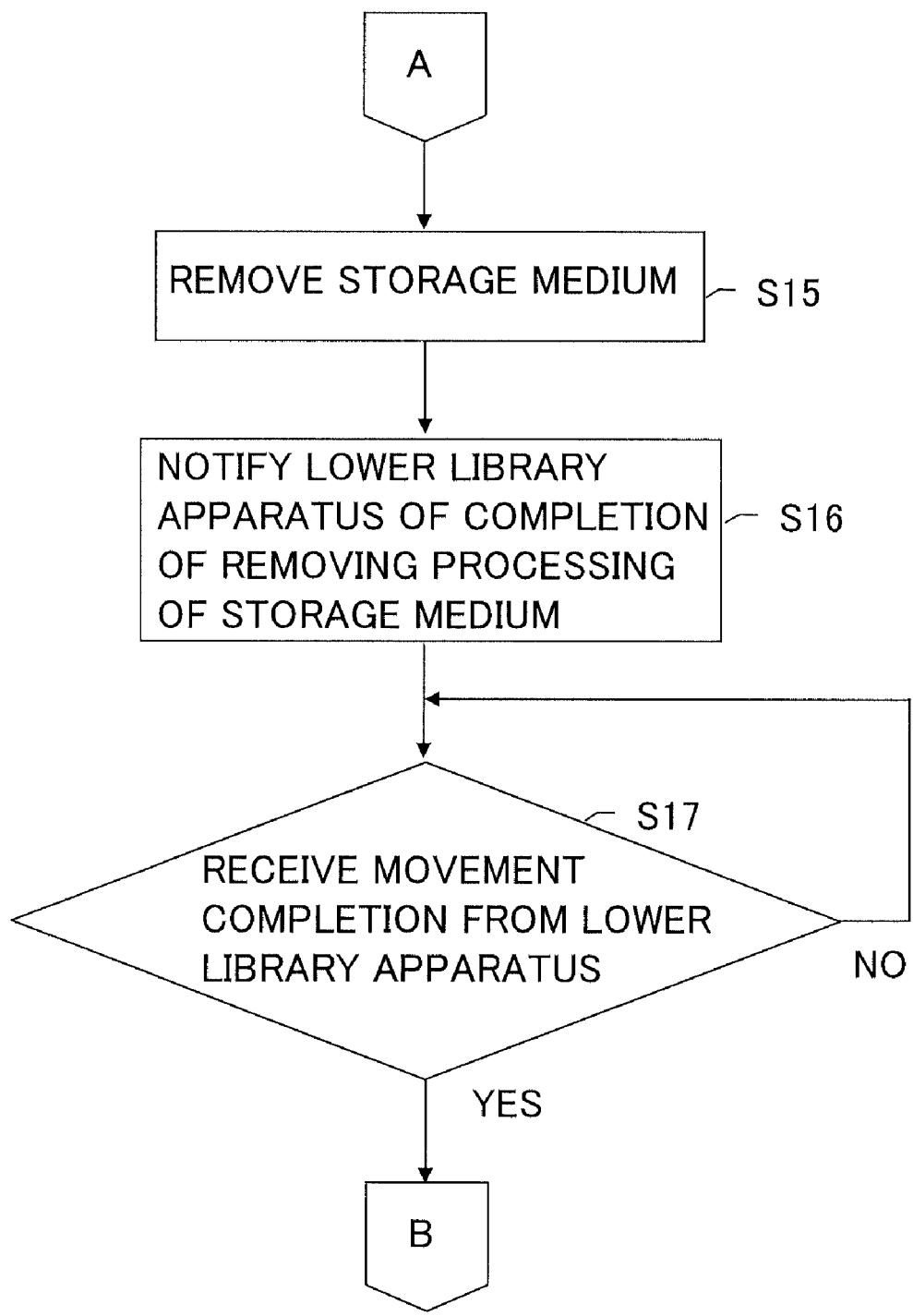

FIGS. 9A to 9D illustrate a flow chart of a middle library apparatus 1B. FIG. 9A illustrates step S11 to step S14. A processing of the middle library apparatus B is controlled by the CPU31 of the middle library apparatus 1B. In step S11, the middle library apparatus 1B receives the movement instruction from the lower library apparatus 1A. In step S12, the middle library apparatus 1B moves the cell unit 21 up into the space 42 of the middle library apparatus 1B to retract the cell unit 21. In step S13, the middle library apparatus 1B notifies the lower library apparatus 1A of completion of the movement processing when the movement is completed. In step S14, the middle library apparatus 1B checks whether to receive notification of the movement completion from the lower library apparatus 1A. FIG. 9B illustrates step S15 to step S17. In step S15, when the notification of the movement completion is received from the lower library apparatus 1A, the middle library apparatus 1B removes the specified storage medium 10 which is stored in the uppermost cell 5 of the cell unit 21 of the lower library apparatus 1A. In step S16, the middle library apparatus 1B notifies the lower library apparatus 1A of completion of the removing processing of the storage medium 10. In step S17, the middle library apparatus 1B checks whether to receive notification of the movement completion from the lower library apparatus 1A.

Figure 9C:
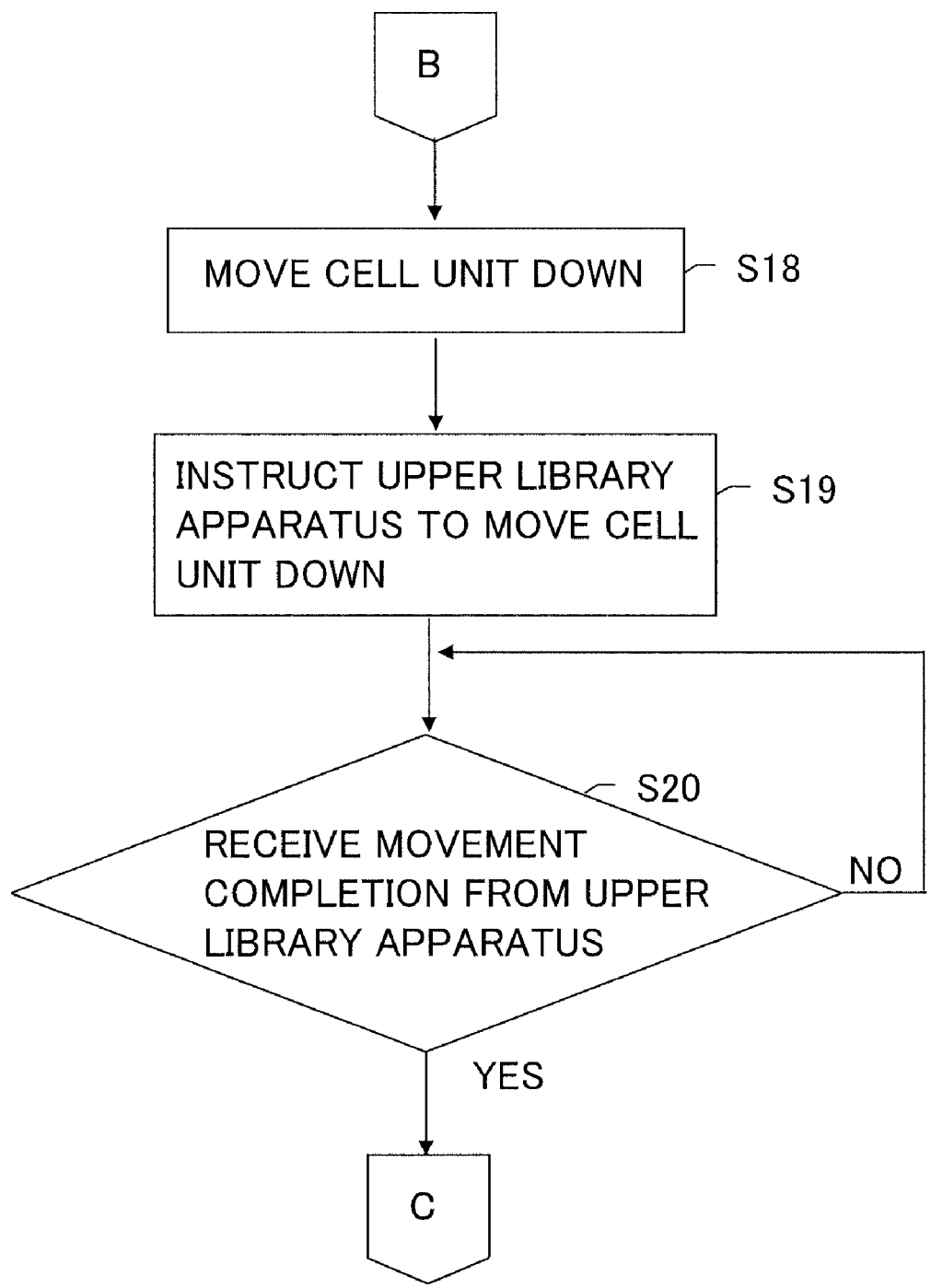
Figure 9D:
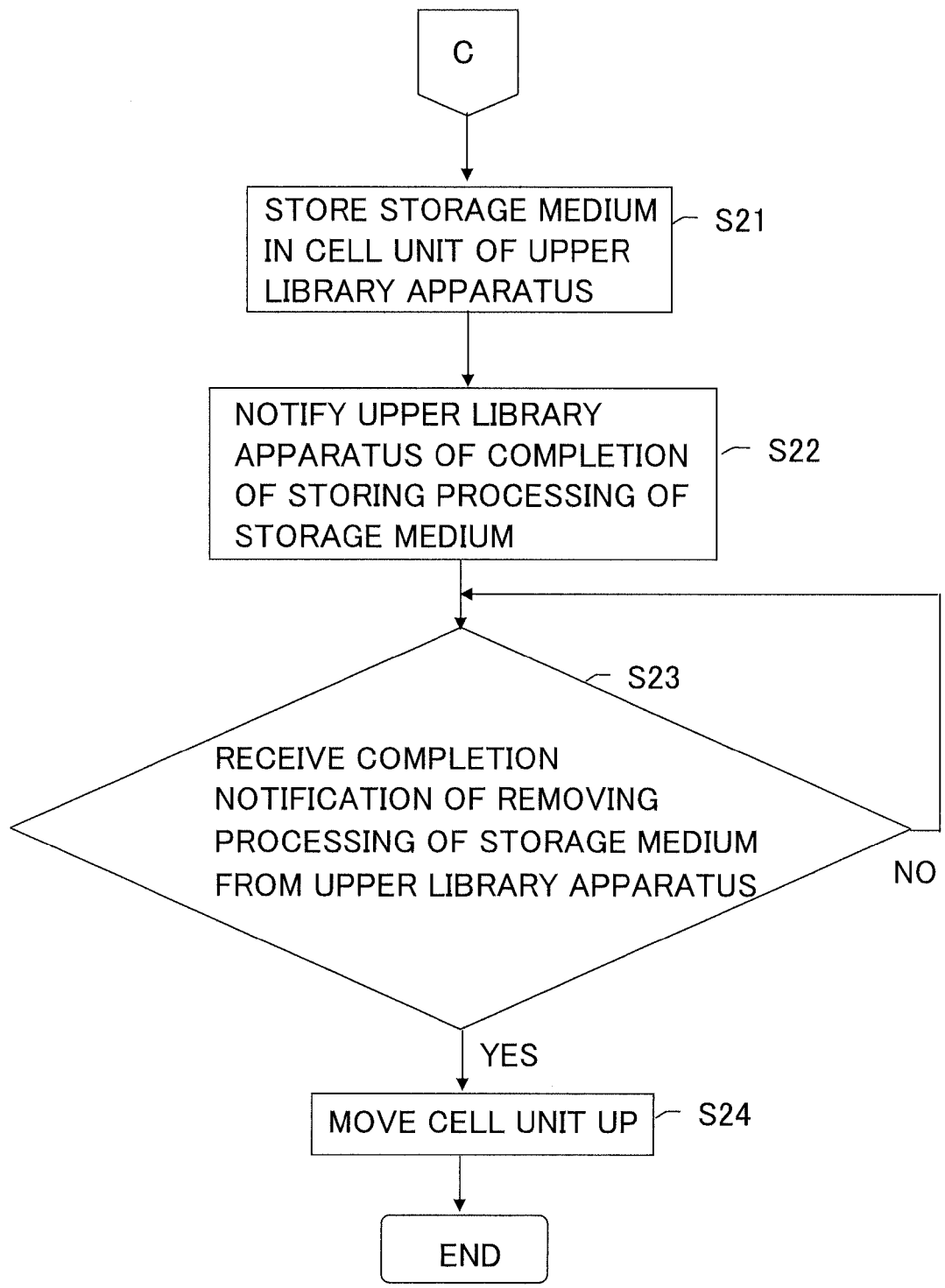

FIG. 9C illustrates step S18 to step S20. In step S18, the middle library apparatus 1B moves the cell unit 21 down into the space 43 to retract the cell unit 21 when the notification of the movement completion is received from the lower library apparatus 1A. In step S19, when the movement of the cell unit 21 of the middle library apparatus 1B is completed, the middle library apparatus 1B instructs the upper library apparatus 1C to move down. In step S20, the middle library apparatus 1B checks whether to receive notification of the movement completion from the upper library apparatus 1C. FIG. 9D illustrates step S21 to step S24. In step S21, when the notification of the movement completion is received from the upper library apparatus 1C, the middle library apparatus 1B stores the storage medium 10 in the lowermost cell 5 of the cell unit 21 of the upper library apparatus 1C. In step S22, the middle library apparatus 1B notifies the upper library apparatus 1C of completion of the storing processing of the storage medium 10. In step S23, the middle library apparatus 1B checks whether to receive completion notification of the removing processing of the storage medium 10 from upper library apparatus 1C. In step S24, the middle library apparatus 1B moves the cell unit 21 up to return to the normal position, when the completion notification of the removing processing of the storage medium 10 is received from the upper library apparatus 1C.

Figure 10A:
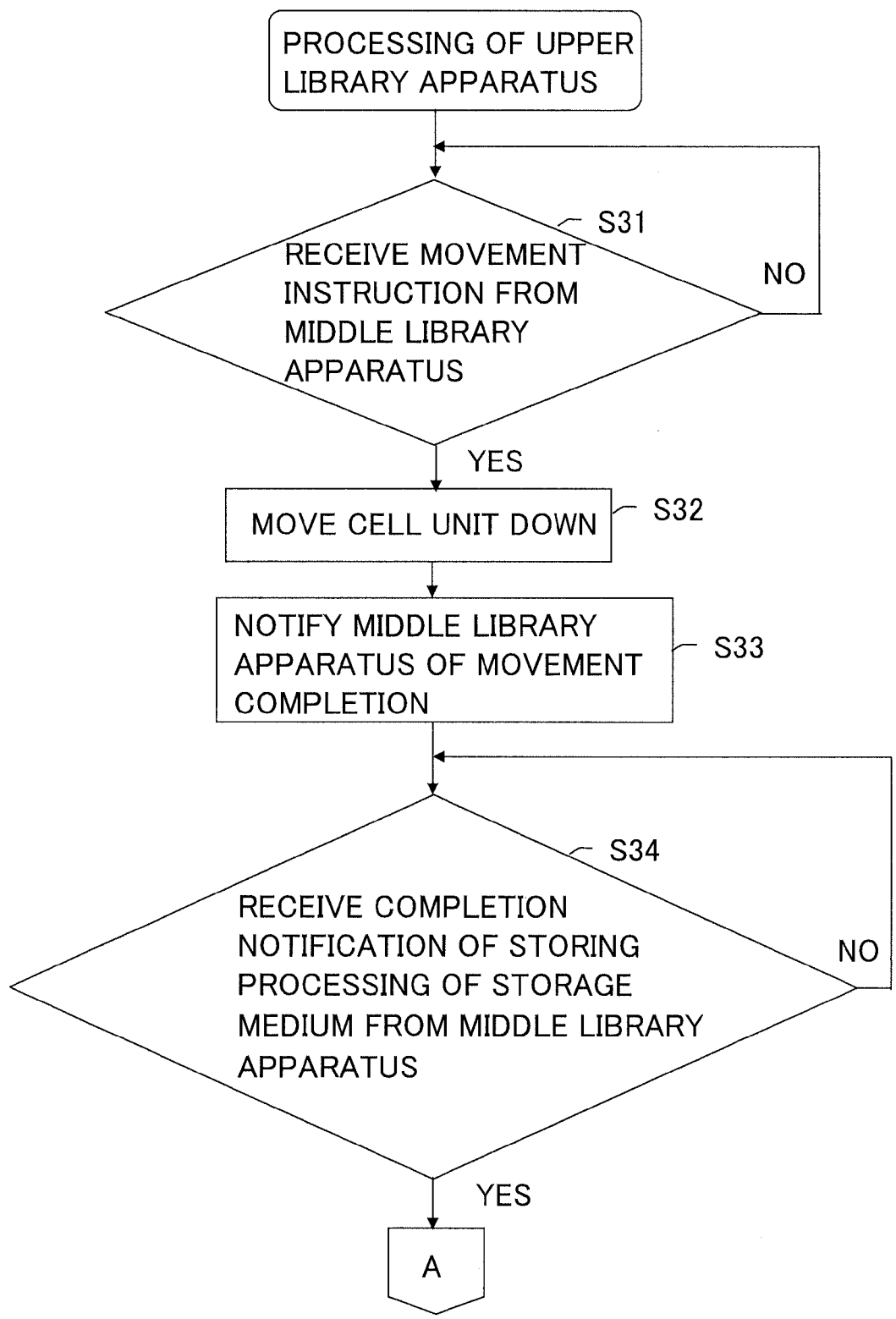
FIGS. 10A and 10B illustrate a flow chart of an upper library apparatus.
Figure 10B:
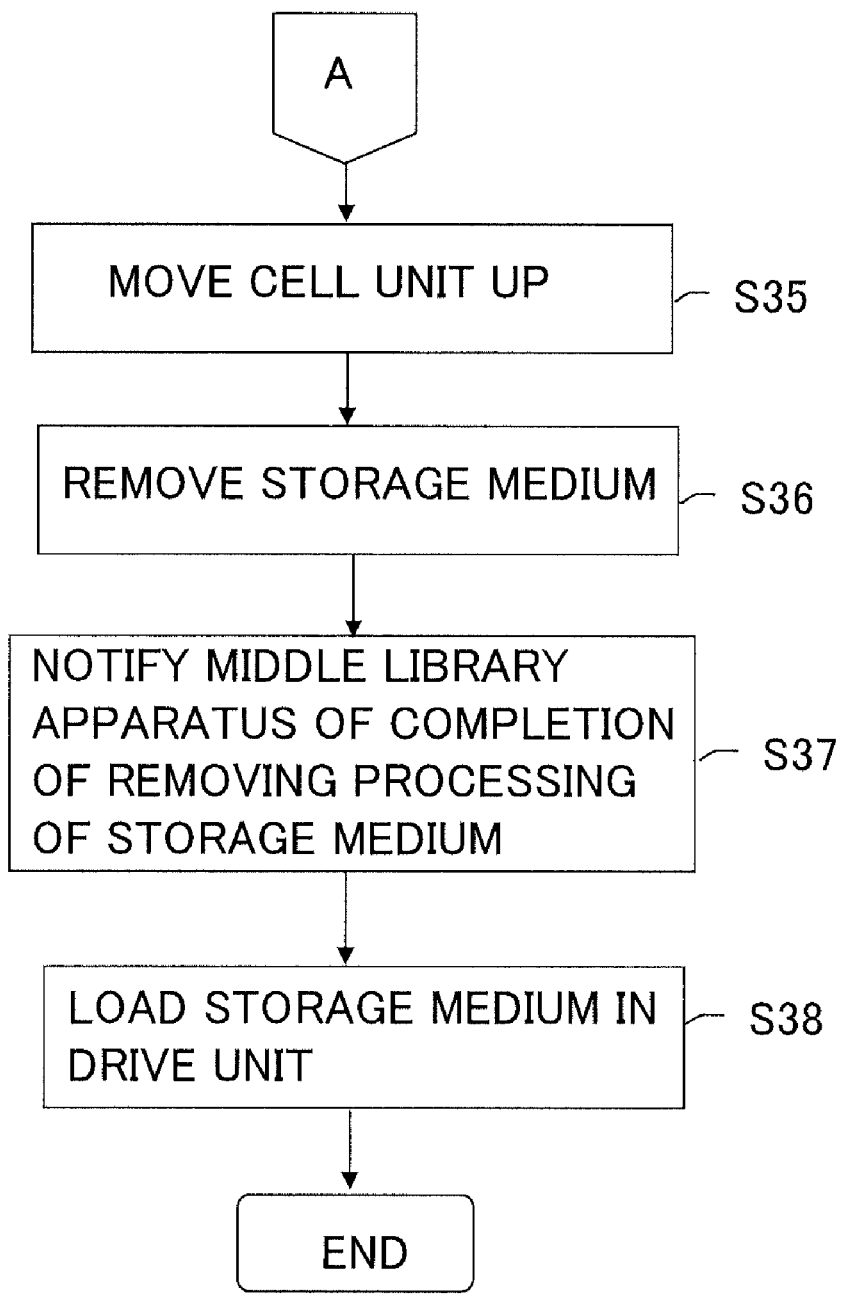

FIGS. 10A and 10B illustrate a flow chart of an upper library apparatus 1C. FIG. 10A illustrates step S31 to step S34. A processing of the upper library apparatus 1C is controlled by the CPU 31 of the upper library apparatus 1C. In step 31, the upper library apparatus 1C checks whether to receive the movement instruction from the middle library apparatus 1B. In step 32, when the movement instruction is received from the middle library apparatus 1B, the upper library apparatus 1C moves the cell unit 21 down to the position where the lowermost cell 5 of the cell unit 21 of the upper library apparatus 1C is accessible by the robot 7 of the middle library apparatus 1B. In step 33, the upper library apparatus 1C notifies the middle library apparatus 1B of completion of the movement processing when the movement of the cell unit 21 of the upper library apparatus 1C is completed.

In step S34, the upper library apparatus 1C checks whether to receive completion notification of the storing processing of the storage medium 10 from the middle library apparatus 1B.

FIG. 10B illustrates step S35 to step S38.

In step S35, when the completion notification of the storing processing of the storage medium 10 is received from the middle library apparatus 1B, the upper library apparatus 1C moves up the cell unit 21 of the upper library apparatus 1C to a normal position. The normal position is a position that the robot 7 can access to all of the cells 5.

In step S36, the upper library apparatus 1C removes the storage medium 10 from the lowermost cell 5 of the cell unit 21 of the upper library apparatus 1C.

In step S37, the upper library apparatus 1C notifies the middle library apparatus 1B of completion of the removing processing of the storage medium 10. In step S38, the upper library apparatus 1C loads the storage medium 10 in the specified drive unit 3. As a result, the transportation processing of the storage medium 10 from the lower library apparatus 1A to the upper library apparatus 1C is completed. The upper library apparatus 1C writes data into or read data from the storage medium 10, when the transportation processing is completed. When the instruction from the host 51 is to read the data from the storage medium 10, the upper library apparatus reads the data from the storage medium 10 and transmits the data to the lower library apparatus 1A. When the lower library apparatus 1A receives the data, the lower library apparatus 1A transmits the data to the host 51. On the other hand, when the instruction from the host 51 is to write the data into the storage medium 10, the upper library apparatus acquires the data of the host 51 from the lower library apparatus 1A and writes the data into the storage medium 10. When the read processing or the write processing is completed, the storage medium 10 is transported from the upper library apparatus 1C to the lower library apparatus 1A via a reverse route.

As described above, since the library apparatus 1 transports the storage medium 10 to other library apparatus 1 by moving the cell unit 21, the library apparatus 1 does not include a new medium transportation mechanism that occupies partially area of the cell 5 and area of the drive unit 3. The number of the storage mediums 10 in the cells 5 is prevented from decreasing. Namely, it is not needed that the number of the cells 5 or the number of the drive units 3 is decreased to secure area and that a new transportation mechanism is provided by using the secured area.

Moreover, there is no need for providing the medium transportation mechanism of the storage medium 10 as a separated unit. Therefore, the installation of an additional library apparatus 1 is facilitated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A library apparatus comprising:
a housing having an opening;
a cell unit including a plurality of cells for storing a storage medium;
a drive unit for writing data into or reading data from the storage medium;
a medium transportation unit for transporting the storage medium between the cells and between each of the cells and the drive unit;
a cell unit driver for moving the cell unit in vertical direction; and
a controller for controlling the cell unit driver to move the cell unit through the opening to a position accessible by a medium transportation unit of another library apparatus stacked in vertical direction.

2. The library apparatus according to claim 1, wherein the opening is formed on the housing adjacent to other library apparatus stacked in vertical direction.

3. The library apparatus according to claim 1, wherein a retraction area of the cell unit is provided between an upper surface of the cell unit and an upper surface of the housing and between an lower surface of the cell unit and an lower surface of the housing.

4. The library apparatus according to claim 3, wherein, when a cell unit of a nearby other library apparatus stacked in vertical direction moves through the opening into a position accessible by the self medium transportation unit, the controller controls to retract a portion of the self cell unit into the retraction area.

5. The library apparatus according to claim 3, wherein the opening has a first opening and a second opening, wherein the controller controls to remove the storage medium from a cell unit of a first other library apparatus that moves through the first opening and controls to store the storage medium into a cell unit of a second other library apparatus that moves through the second opening.

6. A library system comprising:
a first library apparatus; and
a second apparatus being stacked in vertical direction of the first library apparatus,
the first library apparatus including
a first housing having a first opening,
a first cell unit including a plurality of cells for storing a storage medium,
a first drive unit for writing data into or reading data from the storage medium,
a first medium transportation unit for transporting the storage medium between the cells and between each of the cells and the first drive unit,
a first cell unit driver for moving the first cell unit in vertical direction, and
a first controller for transmitting a movement instruction to the second library apparatus, and for controlling the first cell unit driver to move the first cell unit through the first opening to a position accessible by the second apparatus upon receiving a notification of movement completion from the second library apparatus, and for notifying the second library apparatus of movement completion upon the movement of the first cell unit being completed,
the second library apparatus including
a second housing having a second opening positioned to match the first opening of the first library apparatus,
a second cell unit including a plurality of cells for storing a storage medium,
a second drive unit for writing data into or reading data from the storage medium,
a second medium transportation unit for transporting the storage medium between the cells and between each of the cells and the second drive unit,
a second cell unit driver for moving the second cell unit in vertical direction, and
a second controller for controlling the second cell unit driver to move the second cell unit to a retraction area provided in the second housing upon receiving the movement instruction from the first library apparatus, and for notifying the first library apparatus of the movement completion upon retraction movement being completed, and for removing the storage medium from the cell of the first cell unit upon receiving the notification of the movement completion from the first library apparatus.

7. The library system according to claim 6, further comprising a third library apparatus being stacked in vertical direction of the second library apparatus,
the third library apparatus including
a third housing having a third opening positioned to match the second opening of the second library apparatus,
a third cell unit including a plurality of cells for storing a storage medium,
a third drive unit for writing data into or reading data from the storage medium,
a third medium transportation unit for transporting the storage medium between the cells and between each of the cells and the third drive unit,
a third cell unit driver for moving the third cell unit in vertical direction, and
a third controller for controlling the third cell unit driver to move the third cell unit through the third opening to a position accessible by the second apparatus upon receiving a movement instruction from the second library apparatus, and for notifying the second library apparatus of movement completion upon movement of the third cell unit being completed, and for controlling the third cell unit driver to move the third cell unit through the third opening to a position accessible by the third medium transportation unit and removing the storage medium from the cell of the third cell unit upon receiving completion notification of storing processing from the second library apparatus, wherein, the second controller controls the second cell unit driver to move the second cell unit to a retraction area provided in the second housing and transmits the movement instruction to the third library apparatus when the first controller controls the first cell unit driver to return the first cell unit through the first opening to a normal position, wherein the second controller stores the storage medium in the cell of the third cell unit upon receiving the notification of the movement completion from the third library apparatus and notifies the third library apparatus of the completion of the storing processing.

8. Method for transporting a storage medium of a library apparatus, the library apparatus including a housing having an opening, a cell unit including a plurality of cells for storing a storage medium, a drive unit for writing data into or reading data from the storage medium, a medium transportation unit for transporting the storage medium between the cells and between each of the cells and the drive unit, a cell unit driver for moving the cell unit in vertical direction, the method comprising:

storing the storage medium into a prescribed cell of the cell unit by the medium transportation unit; and moving the cell unit through the opening to a position accessible by a medium transportation unit of another library apparatus stacked in vertical direction.

* * * * *